F. A. WIENAND.
ARTIFICIAL TEETH.
APPLICATION FILED JULY 25, 1907.

965,266.

Patented July 26, 1910.

Witnesses:
S. Ford
P. Hadden

Inventor
Friedrich August Wienand
By his Attorney
R. Hadden

UNITED STATES PATENT OFFICE.

FRIEDRICH AUGUST WIENAND, OF PFORZHEIM, GERMANY.

ARTIFICIAL TEETH.

965,266.  Specification of Letters Patent.  Patented July 26, 1910.

Application filed July 25, 1907. Serial No. 385,555.

*To all whom it may concern:*

Be it known that I, FRIEDRICH AUGUST WIENAND, a subject of the German Emperor, residing at Pforzheim, Germany, have invented certain new and useful Improvements in Artificial Teeth, of which the following is a specification.

This invention relates to a method of directly fixing pins, hooks, clamps, eyes and the like of common metal to artificial teeth made of mineral substances by the process of melting or sealing.

It is not new to seal metal pins and the like into artificial teeth, but the methods previously adopted for that purpose are not suitable for practical use.

The present invention provides a method which is distinguished from the previously known methods by the fact that the teeth and fastening devices are not heated in hermetically closed boxes or receptacles, but are embedded, during the heating process, in a granular mass placed upon thick plates of nickel or other fire-proof material.

Figure 1:
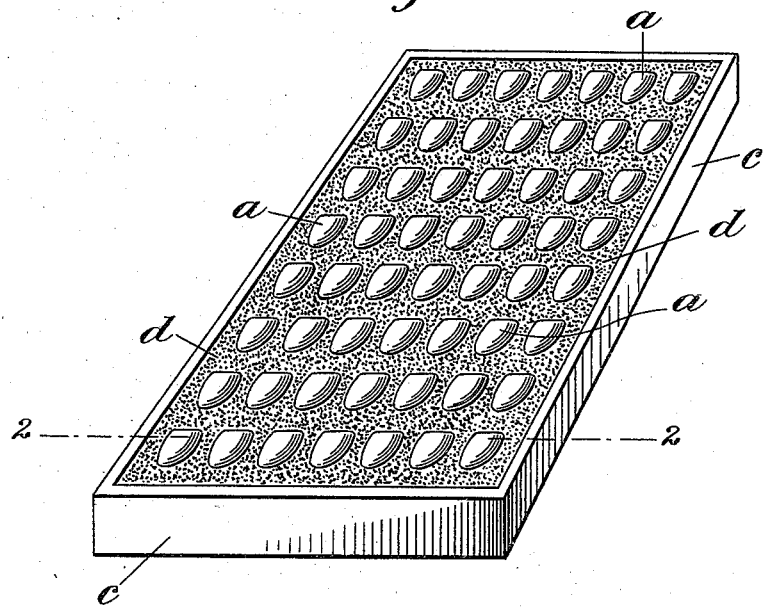
Figure 2:
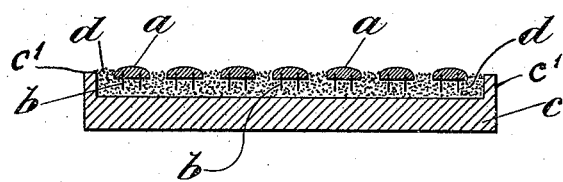
Figure 3:
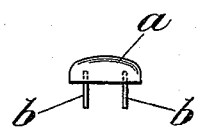

In the annexed drawing Figure 1 is a perspective view illustrating the plate, granular mass, and teeth partially embedded therein. Fig. 2 is a cross-section on line 2—2 Fig. 1. Fig. 3 is an enlarged view of a tooth.

$a$ represents teeth, $b$ pins or fasteners thereof, $c$ the plate, $d$ the granular mass. The said plate $c$ may have a thickness of 15 millimeters or thereabout and is preferably provided with walls $c^1$ to give support to the mass $d$, the walls being, for example, 6 millimeters high. The said mass $d$ consists of granulated nickel or other metal, or of quartz or similar mineral having a higher fusing point than the material out of which the teeth are made, the granules being, for example, of the size of one entire millimeter or thereabout. This mass of highly refractory granules serves to support the teeth and pins during the heating operation and also as a heat-storing means to prevent the too rapid cooling of the teeth. The artificial teeth $a$ are inserted or embedded in this mass $d$, and the plates $c$ are then placed in the furnace, in which they remain until the teeth and fastening devices $b$ are "burnt" or melted together, by partial fusion of the material of which the artificial teeth are made. After this treatment the plates $c$ and teeth $a$ are placed, for cooling, in a hermetically closed box, which is filled up with charcoal to prevent oxidation. The embedding of the teeth in the granular mass, and the comparatively great thickness of the supporting plates, cause the cooling process to be very slow, so that the risk of cracking is greatly reduced as compared with the risk involved by the old methods, and the teeth are consequently cheaper and more durable.

The fastening devices $b$ fixed to the artificial teeth $a$ may consist of nickel with additions of aluminium, iron, steel, tantalum, silver, or other suitable metal, which can be directly melted or melted by electrical means. These metals retain their normal properties during and after the treatment described, are not oxidized because contact with air is prevented, and remain soft, flexible and extensible, so that they answer all technical requirements and are, for the purpose in view, equivalent to pins of precious metal (platinum). The base metal of the fastening devices may also be coated with platinum or other precious or semi-precious metal.

What I claim as my invention and desire to secure by Letters Patent of the United States is:—

The method of securing pins or other fastening devices into artificial teeth, which consists in embedding the teeth with the pins in place therein, in a mass of granular material having a high fusing point contained on a thick plate of refractory material, then heating the plate and its contents until the material of the teeth is fused onto the fastening devices, and allowing the plate and its contents to cool in a hermetically closed receptacle filled with charcoal.

In witness whereof I have signed this specification in the presence of two witnesses.

FRIEDRICH AUGUST WIENAND.

Witnesses:
R. WADHAMS FISHER,
SYDNEY ELLIOTT.